July 2, 1968  R. V. GILLESPIE  3,390,484
FENCE GATE
Filed Jan. 8, 1968  2 Sheets-Sheet 1
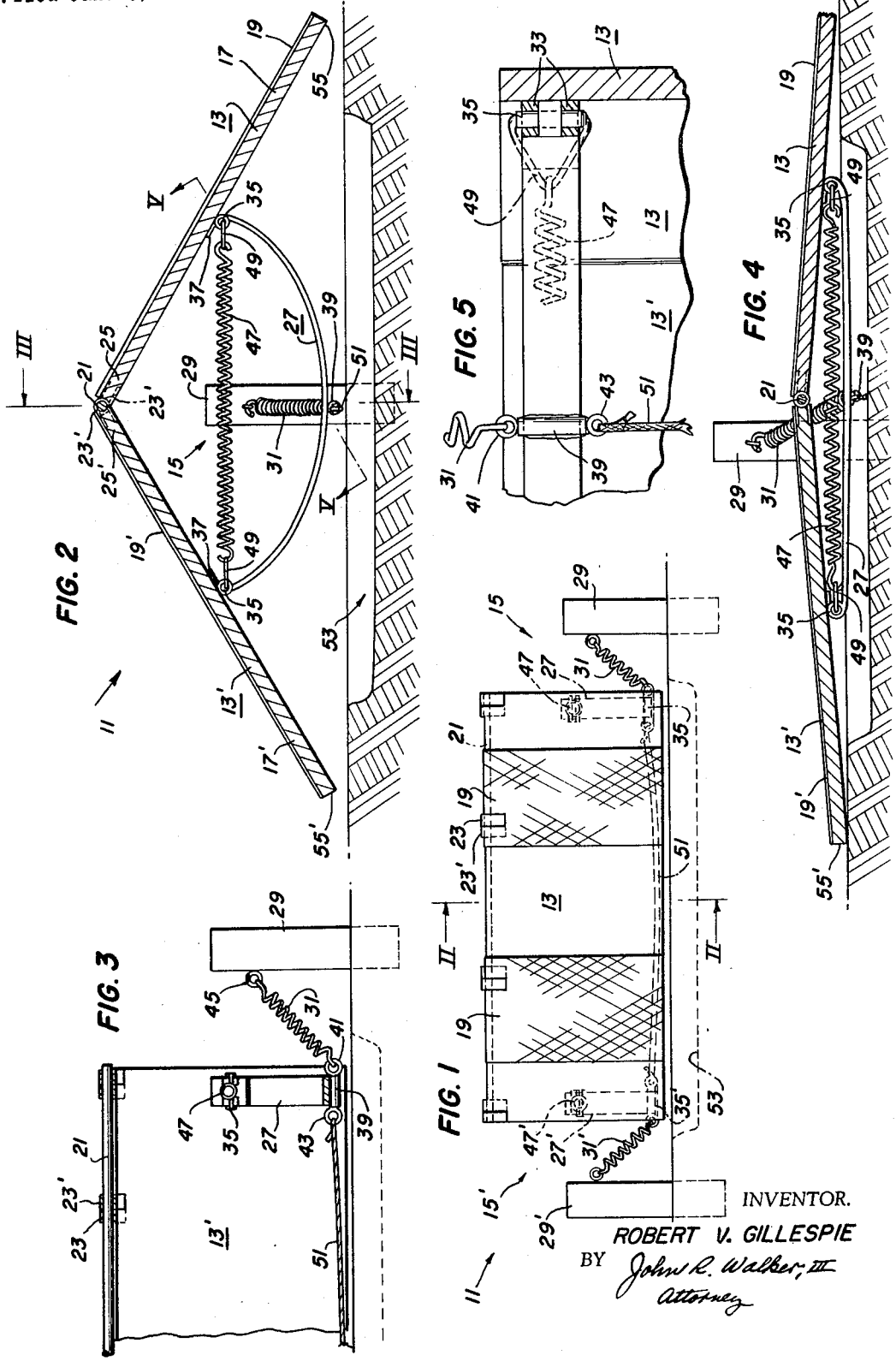
INVENTOR.
ROBERT V. GILLESPIE
BY John R. Walker, II
Attorney

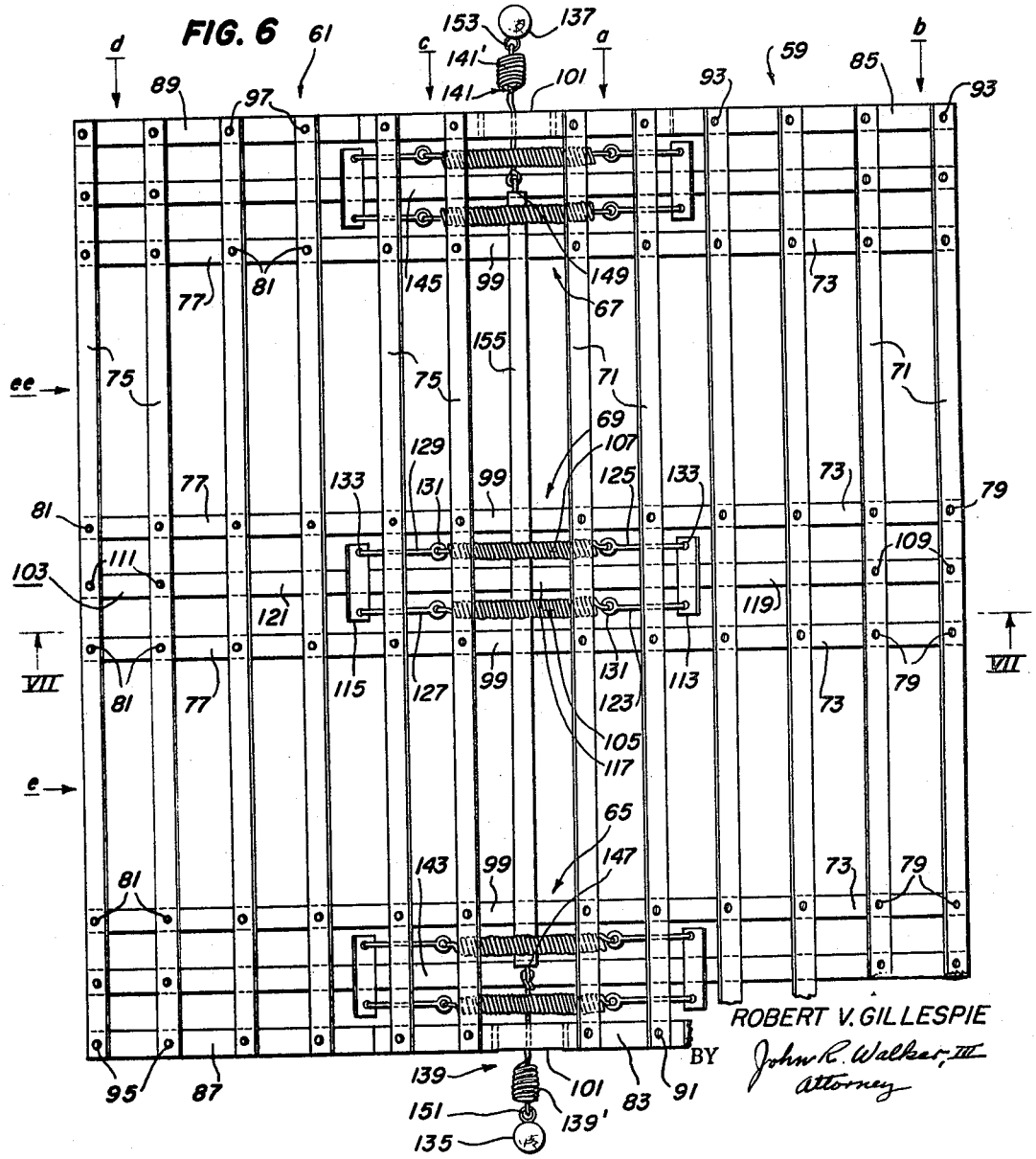

United States Patent Office 3,390,484
Patented July 2, 1968

3,390,484
FENCE GATE
Robert V. Gillespie, Hilanoa Addition, R.R. 2,
Metropolis, Ill. 62960
Continuation-in-part of application Ser. No. 579,250,
Sept. 14, 1966. This application Jan. 8, 1968, Ser.
No. 700,323
10 Claims. (Cl. 49—131)

ABSTRACT OF THE DISCLOSURE

A vehicle-operated vertically movable drive-over type fence gate including a pair of gate panels or sections adapted to be moved between a raised inverted V configuration and a lowered flattened configuration. The gate including a plurality of lifting mechanisms arranged underneath the gate sections for raising the gate to a raised disposition. Each lifting mechanism includes a semielliptical upwardly concave leaf type spring centered under and arranged transversely of the pivot axis of the gate panels. In a modified embodiment each lifting mechanism includes a strip-like spring steel runner secured at its opposite ends to the oppositely arranged fore and aft distal marginal portions of the forward and rearward gate sections. Each gate lifting mechanism includes a helical tension spring mounted on the runner and exerting a bending compressive force on the center region of the runner. The tension spring causing the runner of each lifting mechanism to be urged to a downwardly bent wavelike configuration and thus urge the gate to a raised disposition.

Cross reference to related application

This application is a continuation-in-part of my copending application Ser. No. 579,250, filed Sept. 14, 1966, now abandoned, which was of the type disclosed in my application Ser. No. 436,871, filed Mar. 3, 1965.

Background of the invention (1) *Field of the invention.*—It pertains to drive-over vehicle-actuated gates or to such barrier means useful on a farm or ranch for confining livestock or cattle.

(2) *Description of the prior art.*—The prior art drive-over type gate devices have generally been of complicated construction and difficult to maintain. Many such gate devices include pulleys, ropes, chains, gears or other complex motion-transmitting means which malfunction and present maintenance problems. Also, many such prior art gate devices are heavy and cumbersome and difficult to transport when it is desired to change the location of the gate; many prior art gate devices are substantially permanently installed at a certain location and are not adapted to be moved.

Summary of the invention

The invention presents a drive-over gate of substantially simple design and which does not include various complicated motion-transmitting mechanisms such as ropes, pulleys, gears or the like. The inventive structure is lightweight, strong and durable and requires minimum maintenance. The gate of the present invention is adapated to be readily moved from place to place or from one fenced section to another fenced section. The runner members of the modified embodiment, in addition to providing spring means for urging the gate to a raised configuration, also provide ground-engaging slide means for slidably towing the gate from one location to another location.

Brief description of the drawing

FIG. 1 is a front elevational view of the gate disposed in a raised configuration.

FIG. 2 is a transverse vertical plane sectional view taken as on line II—II of FIG. 1.

FIG. 3 is a vertical plane sectional view taken as on the line III—III of FIG. 2.

FIG. 4 is a transverse vertical plane sectional view similar to FIG. 2 but showing the gate in the lowered configuration.

FIG. 5 is a horizontally oblique fragmentary sectional view taken as on line V—V of FIG. 2.

FIG. 6 is a top view of the gate means of the modified embodiment of the present invention.

FIG. 7 is a vertical plane sectional view taken as on the line VII—VII of FIG. 6.

Description of the preferred embodiments

Referring now to the drawings in which the various parts are indicated by numerals, the gate is indicated in its entirety by numeral 11 and includes basically a pair of gate sections or panels including a front and a rear section or panel, indicated respectively 13, 13', and right and left lifting mechanisms 15, 15'. For purposes of clarity in description, gate 11 will be considered as having a front, back, and right and left sides as may be readily seen in FIGS. 1 and 2. Gate 11 has been illustrated in simplified form with each panel 13, 13' being of integral construction. It will, of course, be understood that gate panel forms other than the integrally constructed panels illustrated and described may be utilized if desired; gate panels of open work construction and such panels having horizontal bars or rails may be utilized in certain embodiments if desired.

Gate panels 13, 13' are substantially alike and include respectively rectangular main body portions 17, 17' and paired vehicle treadway members 19, 19' fixed respectively on the upper surfaces of body portions 17, 17'. A horizontally extending pivot rod 21 and U-shaped strap members 23, 23' pivotally secure or movably connect the front and the back panels or sections together, U-shaped strap members 23, 23' semicircularly engage pivot rod 21 and are secured respectively in the adjacent corresponding edge portions 25, 25' of panel bodies 17, 17'.

Lifting mechanisms 15, 15' are substantially alike and the following description of right lifting mechanism 15 will thus afford a description of both mechanisms 15, 15'.

Lifting mechanism 15 basically includes a semielliptical leaf spring 27, a support post 29, and an obliquely arranged connecting means or helical tension spring 31 (see FIG. 2). Leaf spring 27 is of longitudinaly uniform cross-sectional configuration and is formed of tempered steel strip or strap stock. A pair of coaxially aligned eye portions 33 are formed in the opposite end portions of leaf spring 27 (see FIG. 5). A pair of pivot pins 35 extending respectively through pivot brackets 37 fixed on the underside of respective panel bodies 17, 17' pivotally secure the opposite end portions of leaf spring 27 to the respective gate panels. An anchor bar or bracket 39 is fixedly secured transversely on the underside medial portion of spring 27. Anchor bracket 39 includes eye portions 41, 43 arranged on the opposite end portions of the anchor bracket and disposed on the opposite sides of spring 27. (See FIG. 5.) Support post 29 is fixed in the ground a short distance laterally of gate panel 13, 13' and substantially along a vertical plane intersecting pivot rod 21 (see FIG. 2). An eye screw 45 fixed in the upper portion of support post 29 engages the upper terminal loop portion of helical spring 31. The lower terminal loop portion of spring 31 engages eye portion 41 of leaf spring anchor bracket 39.

Tension spring means is interposed between panels 13, 13' for additionaly urging the panels towards the raised inverted V configuration shown in FIGS. 1–3. This tension spring means preferably includes a second helical tension spring 47 secured at the opposite end portions thereof respectively to the opposite end portions of leaf spring 27, and another helical tension spring 47' secured at the opposite end portions thereof respectively to the opposite end portions of leaf spring 27. If desired, the tension spring means may include only one tension spring interposed between panels 13, 13' anywhere along the lengths thereof, without departing from the spirit and scope of the present invention.

A pair of bail members 49 fixed respectively on the opposite end portions of pivot pins 35 engage the opposite terminal loop portions of spring 47. It will be understood that although spring 27 is described and illustrated as being semielliptical, various other leaf spring configurations less than a semiellipse may be utilized without departing from the spirit and scope of the invention.

A wire rope tie member 51 is secured at the opposite end portions thereof respectively to anchor brackets 39, 39'; the opposite end portions of rope 41 are secured respectively in anchor bracket eye portions 43, 43' of lifting mechanisms 15, 15'. Obliquely extending opposingly arranged springs 31' have a tendency to spread leaf springs 27, 27' apart as the gate is moved to a flattened configuration; wire rope tie members 51 bridges springs 27, 27' and prevents such spreading movement of the spring leaves. A cavity 53 is preferably formed in the ground to receive lifting mechanism leaf springs 27, 27' and tension springs 47, 47' when the gate is disposed in a flattened configuration (see FIG. 4).

FIG. 2 illustrates gate 11 in a normal or raised configuration. For purposes of description lower edges 55, 55' of gate panel body portions 17, 17' have been illustrated as being spaced from the ground surface. It will, of course, be understood that since gate panels 13, 13' are supported below the center of gravity by obliquely extending springs 31, 31' that one or the other of lower edge portions 55, 55' will rest on the ground surface.

In explaining the actions of the gate, consider an automotive vehicle passing over the gate from the rear and engaging and passing over first rear gate panel 13', and then front gate panel 13: The front wheels of the moving vehicle will rollingly engage gate panel 13' and firmly press lower edge portion 55' against the ground surface; as the vehicle moves forward, the front wheels will then move up the inclined gate panel and the weight of the vehicle will stretch helical springs 47, 47' and flatten leaf springs 27, 27'; obliquely extending springs 31, 31' tend to retain a shortened or constrained disposition until leaf springs 27, 27' and helical spring 47, 47' have stretched considerably; as the wheels of the vehicle move further over the gate and the weight of the vehicle is substantially entirely on the gate, obliquely extending springs 31, 31' will then stretch and allow the gate to assume the configuration shown in FIG. 4; the movement of the vehicle across the gate from the rear panel to the front panel causes the gate to shift toward the front panel or toward the right as seen in FIG. 4; as the rear wheels of the vehicle pass over and off of front panel 13, the gate will assume a normal and raised configuration, as shown in FIG. 2. When a vehicle moves over the gate from the front panel to the rear panel, substantially the reverse of the abovedescribed actions occur. In connection with the abovedescribed operation, it should be noted that leaf spring 27, 27' work as a "stop" in the upward or lifting movement and also as a "start."

Referring now to FIGS. 6 and 7, the modified embodiment of the present invention includes a gate body 57, generally flat and symmetrical in form including front, rear and center sections 59, 61, 63; and lifting means for lifting gate body 57 including right, left and center lifting mechanisms 65, 67, 69 respectively. Gate body 57 is adapted to be moved between a flattened horizontal lowered configuration (not illustrated) and a raised inverted V configuration (see FIG. 7).

For purposes of clarity in description, gate body 57 is described as having forward and rearward body portions (59 and 61) and including right and left sides. It is, of course, apparent that the gate is substantially symmetrical and such designations are for disclosure only and either section (59, 61) may be considered as being a forward or rearward section. Also, for purposes of clarification in disclosure gate body 57 will be considered as having transverse and longitudinal members: The transverse members of body 57 are those parts which extend horizontally and laterally; the longitudinal members are those parts which extend fore and aft of gate body 57.

Forward and rearward body sections 59, 61 are alike in size and shape and include respectively transverse and longitudinal members 71, 73 and 75, 77 respectively. Each section 59, 61 is lattice-like or openwork in configuration and transverse and longitudinal members 71, 73, 75, 77 are preferably formed of steel strip material. Rivets 79, 81 respectively of forward and rearward body sections 59, 61 securely join the respective intersecting portions of transverse and longitudinal members 71, 73, 75, 77. Forward and rearward sections 59, 61 preferably include respectively right and left side rail members 83, 85, 87, 89 secured respectively on the opposite end portions of transverse members 71, 75. Rivets 91, 93, 95, 97 extending respectively through the end portions of transverse members 71, 75 and side rails 83, 85, 87, 89 securely attach respectively the side rails of the forward and rearward sections of gate body 57.

Center section 63 of the gate body is preferably formed from a plurality of longitudinally extending tie portions 99, 101. Tie portions 99 preferably are formed integrally with longitudinal strip members 73, 77 of forward and rearward body sections 59, 61. Tie portions 101 are arranged on the left and right sides of the gate body and resiliently flexibly secure respectively rigid side rail members 83, 85, 87, 89. Tie portions 99, 101 of center section 63 thus provide connecting means interposingly connecting the proximal portions of forward and rearward sections 59, 61.

For purposes of clarity, gate body forward and rearward sections 59, 61 are to be considered as having horizontal transversely extending proximal and distal portions: forward section 59 is considered as having a transversely extending proximal portion $a$ and distal portion $b$; rearward gate section 61 is considered as having a transversely extending proximal portion $c$ and distal portion $d$ (see FIG. 6). It will be understood that when gate body 57 is in a raised inverted V configuration (see FIG. 1) center section tie portions 99, 101 will be arcuately tensioned and distal portions $b$ and $d$ of the gate body will restingly engage the ground surface, indicated S. It will also be understood that when gate body 57 is in a lowered flattened configuration, as when the vehicle is moving over the gate body forward and rearward gate sections 59, 61 will be in substantially flat engagement with ground surface S. The right and left wheels of a vehicle as it moves over gate body 57 depresses the body to a flattened configuration. As the vehicle passes over the gate, lifting mechanisms 65, 67, 69, lift the gate to a raised configuration. The path of the vehicle wheels, or the path of the right and left wheels of a vehicle as it moves over the gate body is indicated by lettered arrows $e$ and $ee$: arrow $e$ indicates the path of travel of the wheels on the right side of a vehicle; arrow $ee$ indicates the path of the wheels on the left side of the vehicle.

Lifting mechanisms 65, 67, 69 are alike. The following detailed description of lifting mechanism 69 is thus deemed sufficient for describing also lifting mechanisms 65, 67. Although only three lifting mechanisms are illustrated, it is, of course, apparent in certain embodiments of the invention it may be desirable to have only two lifting mechanisms or perhaps more than three mechanisms without departing from the spirit and scope of the invention.

Center lifting mechanism 69 basically includes a strip-like leaf spring or runner 103 and right and left helical tension springs 105, 107 arranged along opposite sides of runner 103. Rivets 109, 111 extending respectively through the two lowermost transverse members 71, 75 of forward and rearward body sections 59, 61 firmly secure runner 103 subjacently on body 57. The length of runner 103 is such that when the gate is in a flattened disposition, the runner is substantially arranged straight and in a horizontal disposition.

Forward and rearward anchor brackets 113, 115 are transversely fixed in parallel arrangement respectively on runner 103 and substantially demarcate the runner into a center portion 117 and forward and rearward portions 119, 121. Although not specifically shown, anchor brackets 113, 115 preferably are clamped on runner 103. Clamping anchor brackets 113, 115 on runner 103 rather than fastening such parts with rivets or the like prevents weakening the runner at the anchor bracket-runner intersection. Paired rod-formed, hook-shaped links 123, 125 and 127, 129 interconnect respectively springs 105, 107 with anchor brackets 113, 115. Eye portions 131 respectively of forward and rearward links 123, 125, 127, 129 articulatingly engage respectively the anchoring or oppositely arranged hook portions of springs 105, 107. The hook portions respectively of links 123, 125, 127, 129 are articulatingly secured respectively in apertures 133 in forward and rearward anchor brackets 113, 115.

In certain embodiments of the invention it may be desirable to have more or less than two helical tension springs for each runner 103. Also, if desired, a turnbuckle may be substituted for each link 123, 125, 127, 129 and in such an embodiment the height of gate body 57, in a raised disposition, may be adjustably varied. Turnbuckle means by adjustably tensioning helical tension springs 105, 107 provide means for adjustably changing the distance between anchor brackets 113, 115 and thus, by causing more or less curve in center portion 117 of the runner, to adjustably vary the height of the gate.

Runner 103 is preferably formed of spring steel strip stock and in a normal unsprung disposition is configured substantially rectilinearly; runner 103 is preferably longitudinally uniform in section and resists a bending action uniformly throughout its length. In an alternate embodiment of the inventive structure, it may be desirable to form the runner 103 with a slight curve at its center portion 117. By permanently forming the center portion of the runner 103 to a slight upwardly concave configuration, the runner will be continuously urged downwardly at the center portion thereof and thus in reaction against ground surface S will cause the gate to be continuously urged upwardly even when the gate is in a flattened disposition and the runner 103 is substantially rectilinear.

Another method for causing the runner 103 to be urged downwardly and a method of obtaining substantially the same action as that above described is contemplated: It is contemplated that rather than permanently configuring the center portion of the runner in a curved disposition, that a semielliptical leaf spring, such as an automotive type leaf spring, may be utilized. Clamping or otherwise securing a formed semielliptical leaf spring to the center portion 117 of the runner 103 causes the center portion of the runner to be urged downwardly and provides substantially the same action as permanently curving the center portion of the runner.

The following describes the operation or function of the gate structure of FIGS. 6 and 7: Consider that gate body 57 is in a raised inverted V configuration with distal portions b and d restingly engaging ground surface S. Consider further that an automotive vehicle will move over the gate from rearward section 61 to forward section 59, or in a direction from left to right as viewed in the drawings. Considering the above, the actions of the gate structure will be substantially as described in the following:

As the wheels of the vehicle roll along the ground and rollingly engage the lowermost ones of transverse members 77 of gate body rear section 61 the weight of the vehicle causes runner rearward portions 121 of lifting mechanisms 65, 67, 69 to be depressed downwardly; the downward movement of rearward portions 121 of lifting mechanisms 65, 67, 69 causes distal transverse portion b of gate body 57 to lift from the ground surface. Such action prevents distal portion b from being urged into the ground surface. As the vehicle approaches center portion 63 of the gate, runner 103 is flattened and both opposite distal portions b and d have a tendency to lift from the ground surface. As the vehicle continues its movement and moves onto forward section 59 of the gate body, forward distal edge b of forward section 59 is further lifted. As the vehicle continues movement and rolls off forward section 59 runner members 103 and helical coil springs 105, 107 will reposition the gate body to a raised configuration.

The gate structure of the invention preferably includes means for laterally and longitudinally positioning gate body 57 and for preventing the gate body from being shifted out of position as a vehicle moves over the gate structure. The gate positioning means includes upstanding support means in the form of right and left posts 135, 137 and right and left connecting means 139, 141 substantially interconnecting center portions 143, 145 of right and left lifting mechanisms 65, 67 and posts 135, 137. Connecting means 139, 141 preferably include springs 139', 141'. Eye brackets 147, 149 and 151, 153 fixed respectively on runner center portions 143, 145 and posts 135, 137 threadedly receive and anchor respectively the opposite end portions of connecting means 139, 141. The gate positioning means substantially tethers the gate body in a desired place as the gate is used. In addition, a tie bar 155 is preferably provided which extends across the center portions of runners of lifting mechanisms 65, 67, 69, and is fixedly attached thereto by suitable means.

Now while I have shown and described preferred embodiments of the present invention, it will be understood that various modifications in the disclosed structures may be made without departing from the scope of the invention as defined in the claims.

I claim:

1. A drive-over fence gate comprising front and rear gate panels each having right and left portions, means pivotally securing said gate panels together along corresponding edge portions, means yieldably urging said gate panels toward an inverted V configuration including right and left lifting mechanisms; each mechanism including a generally semielliptical upwardly concave leaf spring centered under and arranged transversely of the pivot axis of the gate panels and arranged respectively adjacent to right and left portions of said gate panels, pivot means pivotally connecting each end of said leaf spring to the under portions respectively of said front and rear gate panels, an anchor bracket secured on the medial portion of said leaf spring, an upstanding support member, and a horizontally obliquely arranged helical tension spring firmly secured at the upper end thereof to said support member and firmly secured at the lower end thereof to said leaf spring bracket.

2. A gate as defined in claim 1 which includes tension spring means interposed between said panels for urging said panels toward said inverted V configuration.

3. The gate of claim 2 in which said tension spring means includes a pair of helical tension springs respectively secured at opposite end portions thereof to opposite end portions of said leaf spring in said right and left lifting mechanisms.

4. A gate as defined in claim 1 which additionally includes a long tie member secured at opposite end portions thereof to the leaf spring anchor brackets respectively of said right and left lifting mechanisms and extending between said mechanisms.

5. A drive-over fence gate comprising front and rear generally planar gate sections, means movably interconnecting said gate sections for movement between a raised configuration in which said sections are arranged in an inverted V configuration and a lowered configuration in which said gate sections are arranged in a substantially flattened horizontal configuration substantially flat against the ground, means yieldably maintaining said gate sections in said raised configuration including lifting mechanisms; each lifting mechanism including a leaf spring connected adjacent the opposite ends thereof respectively to said gate sections and means including tension spring means interposed between said gate sections for urging said gate sections towards one another.

6. A drive-over vehicle-actuated fence gate comprising a body, including a forward generally planar section having oppositely arranged generally parallel proximal and distal portions, a rearward generally planar section having oppositely arranged generally parallel proximal and distal portions and including a center section arranged between said forward and rearward sections and including connecting means flexibly interposedly connecting the proximal portions respectively of said forward and rearward sections; said body being adapted to be moved between a flattened horizontal lowered configuration wherein said forward and rearward sections are arranged substantially flat against the ground, and a raised configuration wherein said forward and rearward sections are in inverted V arrangement and wherein the distal portions only of said forward and rearward sections engage the ground surface; and means for yieldably maintaining said gate body in said raised configuration including a left and a right lifting mechanism arranged respectively on the left and right sides of said gate body, each lifting mechanism including a spring steel strip-like runner firmly secured only at its opposite end portions respectively to the distal portions of said forward and rearward body sections, and including at least one helical tension spring arranged along the central portion of said runner, the opposite end anchoring parts of said helical spring being anchored each end on that portion of said runner between its center and a respective runner end portion, said helical spring being substantially constantly tensioned thereby placing the central intermediate portion of said runner under compression and urging that portion to a downwardly curved configuration and the gate body to a raised configuration.

7. A fence gate as defined in claim 6 wherein said forward and rearward gate body sections each are formed lattice-like and include longitudinal and transverse strips of spring steel firmly secured together at their intersecting portions.

8. A fence gate as defined in claim 6 wherein said connecting means flexibly interposedly connecting said proximal portions of said forward and rearward gate body sections include strip-like spring steel longitudinally extending tie portions resiliently flexibly interconnecting said forward and rearward body sections.

9. A fence gate as defined in claim 6 wherein said forward and rearward gate body sections each include oppositely arranged left and right longitudinally extending substantially rigid side members, and the remainder of each body section includes longitudinal and transverse spring seel strip members firmly resiliently joining said left and right side members.

10. A fence gate as defined in claim 6 which additionally includes right and left upstanding support means spaced laterally respectively from the opposite sides of said gate body center section and includes right and left rope means tensioned respectively between said right and left support means and the central portion respectively of the runner of said left and right lifting mechanisms.

References Cited

UNITED STATES PATENTS

| | | | |
|---|---|---|---|
| 1,253,453 | 1/1918 | Zorn | 49—131 |
| 2,259,581 | 3/1918 | Zorn | 49—132 X |
| 1,783,579 | 12/1930 | McGrath | 49—131 X |
| 1,984,861 | 12/1934 | Brown | 49—274 X |
| 2,024,063 | 12/1935 | Roper | 49—131 |

FOREIGN PATENTS

| | | |
|---|---|---|
| 241,739 | 11/1962 | Australia. |
| 764,528 | 12/1956 | Breat Britain. |

DAVID J. WILLAMOWSKY, *Primary Examiner.*

DENNIS L. TAYLOR, *Assistant Examiner.*